United States Patent [19]

Maurer et al.

[11] Patent Number: 5,531,464

[45] Date of Patent: *Jul. 2, 1996

[54] CART WITH SNAP-LOCKING MEMBERS

[76] Inventors: Raymond N. Maurer, 21771 Sunflower, Novi, Mich. 48375; David A. Maurer, 30W077 Willow La., Warrenville, Ill. 60555

[ * ] Notice: The term of this patent shall not extend beyond the expiration date of Pat. No. 5,294,009.

[21] Appl. No.: 352,599

[22] Filed: Dec. 9, 1994

[51] Int. Cl.⁶ .................................................... B62B 3/02
[52] U.S. Cl. .................... 280/47.35; 280/79.3; 211/126; 211/189; 403/217
[58] Field of Search ................................ 280/79.11, 79.3, 280/79.7, 47.35; 211/126, 182, 189, 194; 248/165; 403/217, 218, 219, 292, 300, 327, 329

[56] References Cited

U.S. PATENT DOCUMENTS

| | | | |
|---|---|---|---|
| 3,221,466 | 12/1965 | Downing, Jr. et al. | 403/219 |
| 3,502,227 | 3/1970 | Konstant et al. | 211/177 |
| 3,851,601 | 12/1974 | Davis | 211/182 |
| 4,321,873 | 3/1982 | Nealis | 108/91 |
| 4,391,545 | 7/1983 | Zummer | 403/329 |
| 4,403,886 | 9/1983 | Haeusler | 403/217 |
| 4,934,848 | 6/1990 | Beaulieu | 403/217 |
| 4,973,110 | 11/1990 | Nyquist | 312/265.3 |
| 4,998,023 | 3/1991 | Kitts | 280/79.3 |
| 5,012,937 | 5/1991 | Owens | 211/189 |
| 5,127,762 | 7/1992 | Havlovitz | 403/300 |
| 5,169,009 | 12/1992 | Bomze | 211/74 |
| 5,185,982 | 2/1993 | Hostetler | 403/217 |
| 5,294,009 | 3/1994 | Maurer et al. | 211/126 |
| 5,326,337 | 7/1994 | Pardella | 403/329 |
| 5,433,326 | 7/1995 | Horian | 211/194 |

*Primary Examiner*—Anne Marie Boehler
*Assistant Examiner*—Min S. Yu
*Attorney, Agent, or Firm*—Dressler, Goldsmith, Shore & Milnamow, Ltd.

[57] ABSTRACT

A readily assemblable and disassemblable cart has snap-locking vertical and lateral members. The vertical members and top and bottom rails include notched end portions which define extended portions. The lateral rails have bores formed in each of the ends thereof for receiving two of the extended portions. The extended portions also include latching members which, when the cart is assembled, extend into openings in the lateral rails which are transverse to, and contiguous with the bores.

10 Claims, 3 Drawing Sheets

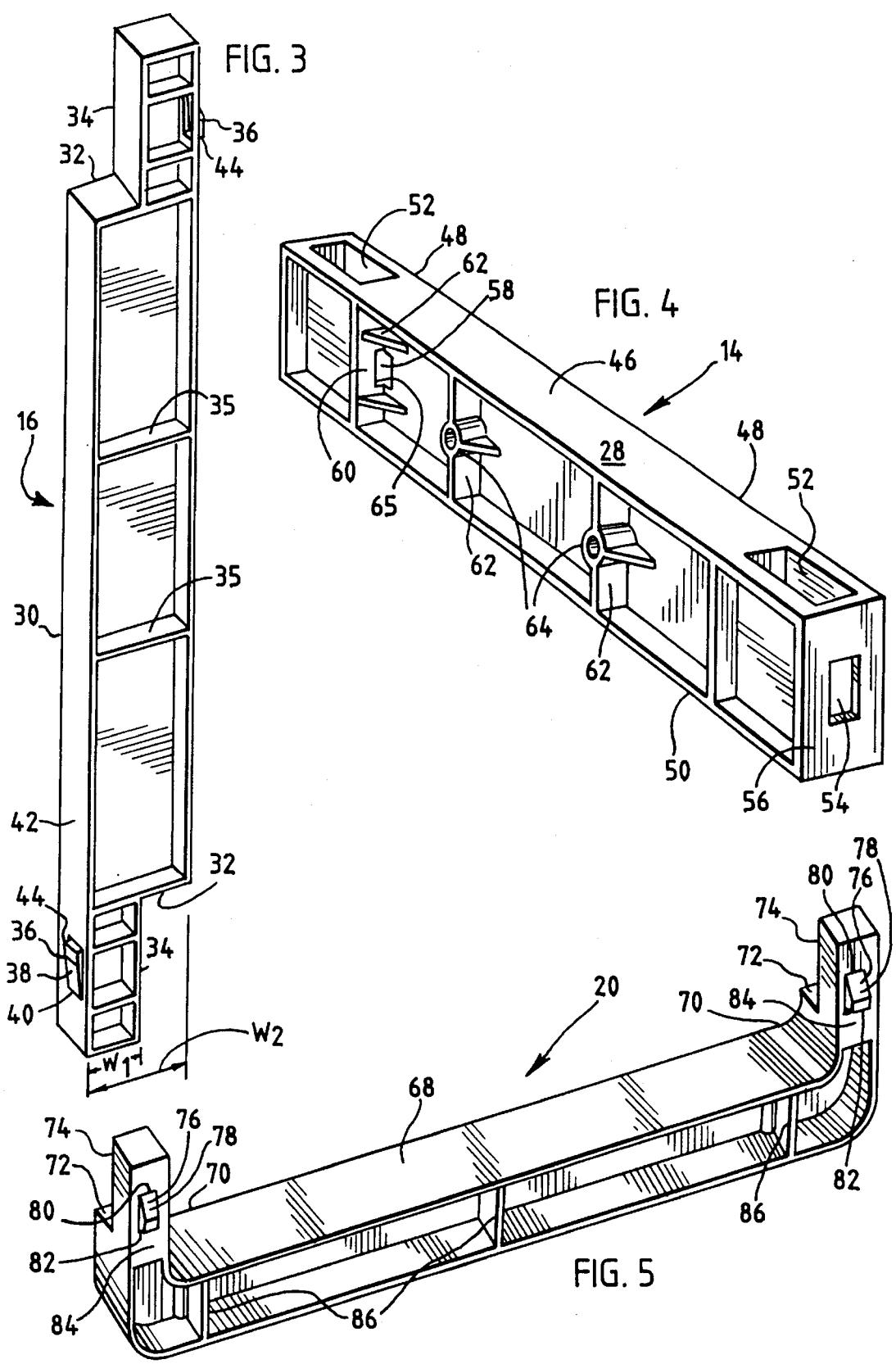

CART WITH SNAP-LOCKING MEMBERS

FIELD OF THE INVENTION

This invention pertains to carts having snap-locking members; and more particularly, to readily assemblable and disassemblable carts having conjoinable, locking vertical and lateral members.

BACKGROUND OF THE INVENTION

Carts, such as laundry carts, are known in the art. Such carts are available in a wide variety of configurations and designs. One such type of cart includes a frame which may be formed from connected vertical and horizontal members.

The frame may be permanently assembled, such as by molding (in the case of a plastic material) or by welding. Alternatively, the frame may be assemblable with fasteners, such as bolts.

In such carts, baskets may be fixedly attached thereto, or the baskets may be slidable along rails of the cart to facilitate storage and retrieval of items stored therein. One example of a cart which includes slidable baskets and a frame assembled using fasteners is disclosed in Maurer et at., U.S. Pat. No. 5,294,009, entitled "Laundry Cart Apparatus," which patent is owned by the present applicants.

The cart disclosed in the aforementioned Maurer et al. patent includes connectable vertical and lateral frame members. The members are joined together using serrated, cylindrical fasteners or pins which are inserted into bores in the members when the members are adjacent to each other and the bores are aligned.

In a typical arrangement having, for example, four pairs of lateral members, thirty-two pins are required to assemble the cart. Moreover, although such a cart is readily assembled, removal of the pins, and thus disassembly may be difficult.

Other types of carts are assembled using standard metal or plastic nuts and bolts. Such methods of assembly, which require large numbers of small parts, makes for cumbersome and time consuming assembly. Also, of course, with such a large number of small parts, there is always the potential for losing parts necessary for assembly.

Still other types of carts are formed as integral or "one piece" units. Such carts are not readily assemblable and disassemblable, and thus lack the flexibility of the afore-described carts.

Thus, there continues to be a need for a flexible, easily assemblable and disassemblable cart, which uses a minimum number of different parts.

SUMMARY OF THE INVENTION

A readily assemblable and disassemblable cart is disclosed which uses a snap-locking feature for joining the frame members of the cart together. The cart includes a frame and baskets which are slidable along lateral rails or runners of the frame.

The frame has a pair of substantially identical, generally rectangular end frame portions. Each end frame includes vertical members connected by top and bottom rails. The end frame members are connected together and connected to each other by lateral rails.

The ends of each of the vertical members and the ends of each of the top and bottom rails have a notch formed therein, which defines an extended portion of the member or rail. In a preferred arrangement, the extended portions of the top and bottom rails are substantially identical to the extended portions of the vertical members. The extended portions are about one-half of the width of a vertical member.

Each of the lateral rails has a bore formed therein, which is configured to receive the extended portions of two vertical members. Likewise, the bore can receive the extended portion of one vertical member and the extended portion of a top or bottom rail. The lateral rails also include a pair of openings which are transverse to, and contiguous with, the bore.

The extended portions each have a latching member formed on an outer surface thereof. The latching member is movable between a first position and a second position. In the second position, the latching member extends outwardly from the outer surface.

The frame is assembled by inserting a pair of vertical members, at their respective extended portions, into the bore of a lateral member. The latching members extend into the openings of the lateral rails and snap-lock the frame members together. In a preferred embodiment, the latching members are biased toward the second or outwardly extended position.

To disassemble the cart, the latching members are depressed, and the extended portions are then removed from the lateral rails. The cart thus described is readily assembled and disassembled, and provides ease of use, storage and transport.

Other features and advantages of the present invention will be apparent from the following detailed description, the accompanying drawings, and the appended claims.

BRIEF DESCRIPTION OF THE FIGURES

FIG. 3 is a perspective view of a vertical member of the cart of FIG. 1;

FIG. 4 is a perspective view of a lateral rail of the cart of FIG. 1; and

FIG. 5 is a perspective view of an exemplary top or bottom rail of the cart of FIG. 1.

DETAILED DESCRIPTION OF THE PREFERRED EMBODIMENT

Figure 1:
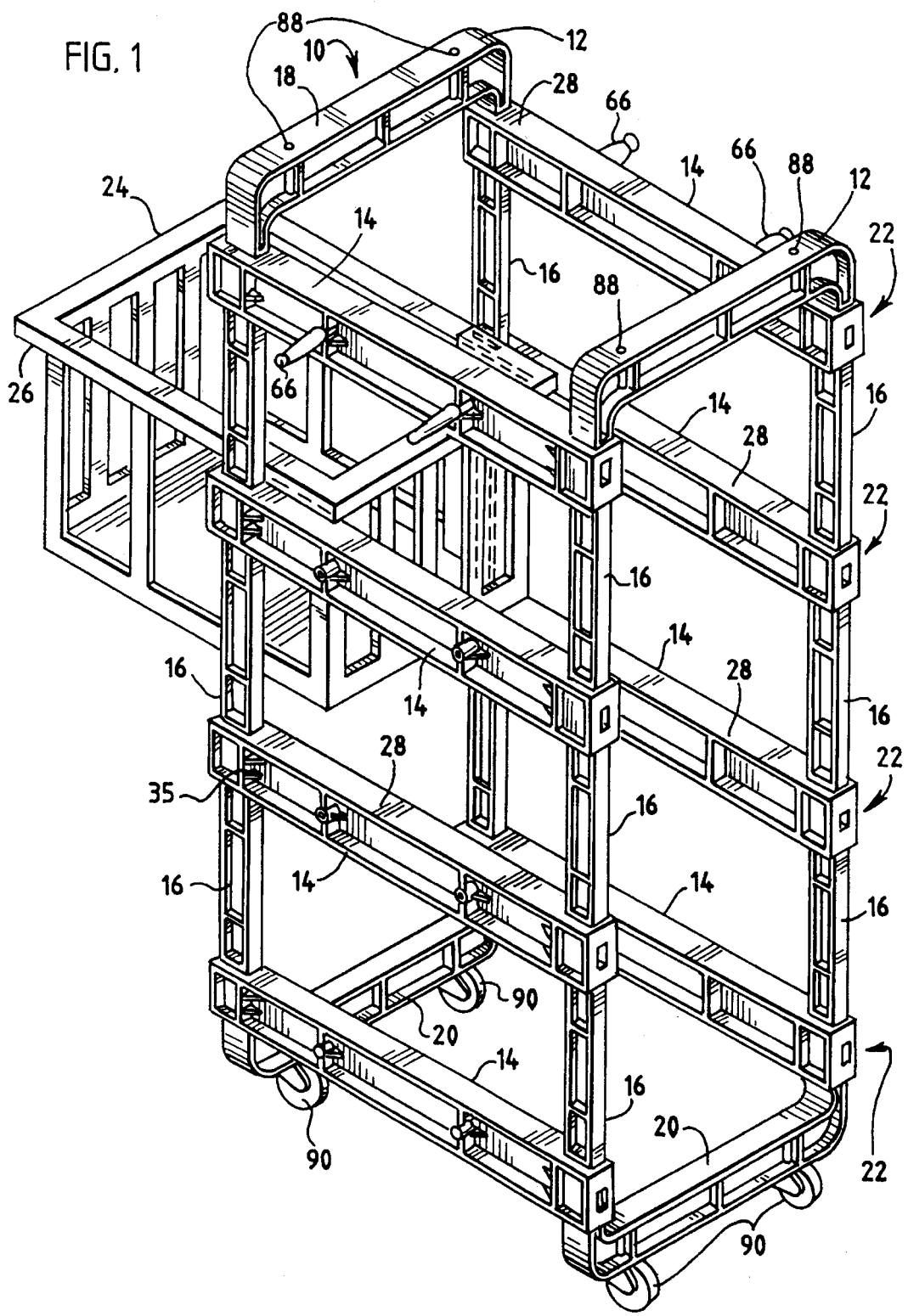
FIG. 1 is a perspective view of an exemplary cart having snap-locking members, and showing a basket mountable thereon, in accordance with the principles of the present invention.

While the present invention is susceptible of embodiment in various forms, there is shown in the drawings and will hereinafter be described a preferred embodiment with the understanding that the present disclosure is to be considered an exemplification of the invention and is not intended to limit the invention to the specific embodiment illustrated.

Referring now to FIG. 1, there is shown a cart 10 which embodies the principles of the present invention. The cart 10 includes a pair of substantially identical end frame portions 12 which are connected, one with the other, by a plurality of lateral rails 14.

Each end frame portion 12 has at least one pair of corresponding vertical members 16, a top rail 18 and a bottom rail 20. A lateral rail 14 joins and extends from each juncture, shown generally at 22, of vertical member 16 to vertical member 16 or vertical member 16 to top or bottom rail 18 or 20.

In a preferred embodiment, each end frame 12 includes a plurality of corresponding vertical members 16. In the exemplary cart shown in FIG. 1, each end frame portion 12 includes three pairs of corresponding vertical members 16. The end frames 12 are connected to each other by four pairs of lateral rails 14.

The end frame 12 members and lateral rails 14 are preferably formed of an injection molded plastic, such as polypropylene or like material. Those skilled in the art will recognize, however, that other materials and/or methods of manufacture may be used. Such other materials and/or methods of manufacture are within the scope of the present invention.

The cart 10 also includes a plurality of baskets 24 (one shown for clarity of illustration). The baskets 24 include a lip 26 which extends outwardly from the body of the basket 24. The basket 24 is slidably receivable, by the lip 26, along a surface 28 of an associated lateral rail 14. The lip 26 may extend around the periphery of the body of the basket 24, or the lip 26 may extend only outwardly from the body of the basket 24 toward the lateral rails 14.

Referring now to FIG. 3, therein is shown an exemplary vertical member 16. The vertical member 16 includes a main body portion 30. At each end of the member 16, a notch 32 is formed which defines an extended portion 34. Each of the extended portions has a width $w_1$ which is about one-half of the width $W_2$ of the main body portion 30.

The member 16 has a generally I-beam shaped cross-section, and may include rib-like members 35 to provide additional structural rigidity to the member 16.

Figure 2:
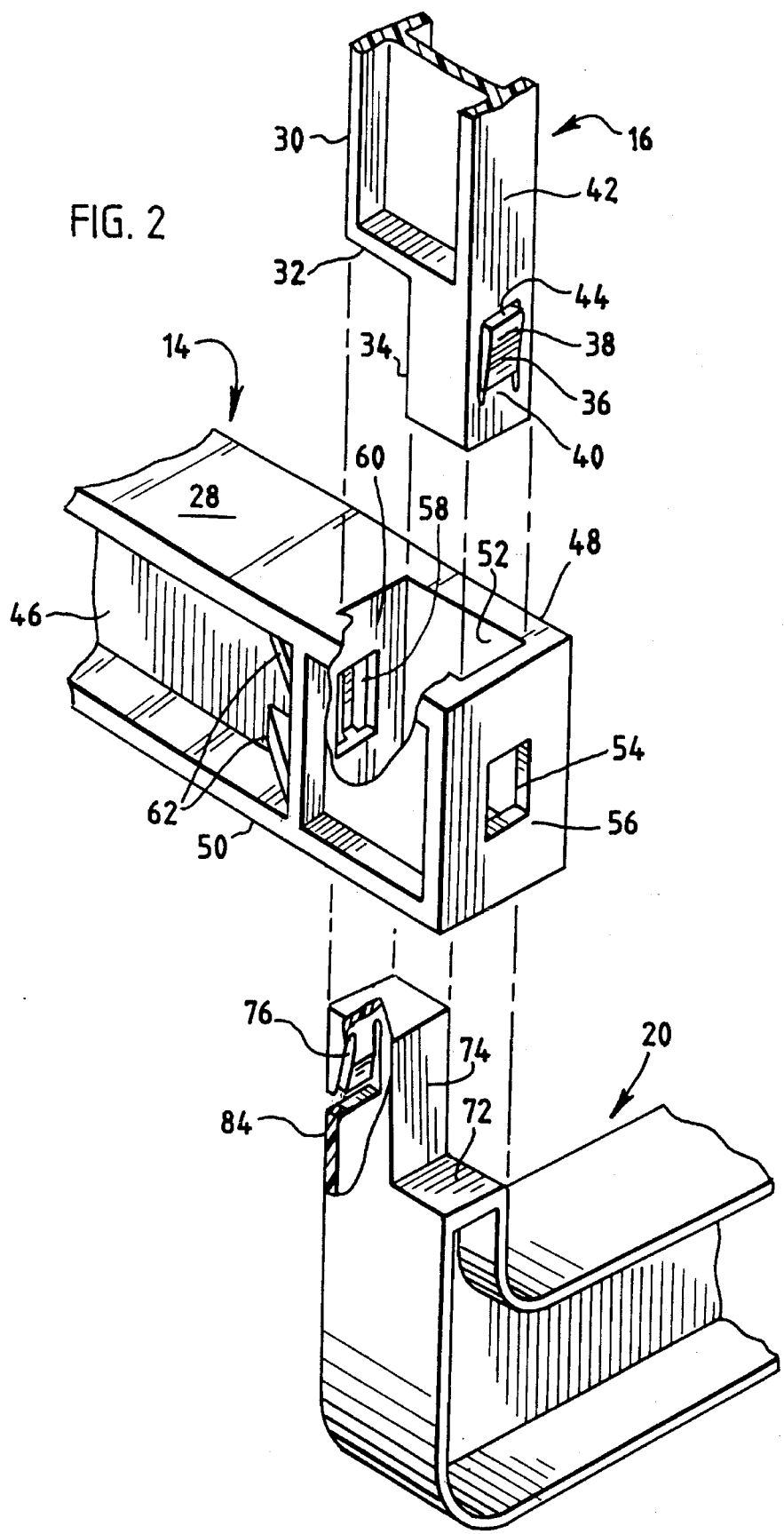
FIG. 2 is an exploded, partial perspective, and partially broken-away view of a joint or connection of the cart of FIG. 1.

The extended portions each include a latching member 36 formed therein or mounted thereto. With reference now to FIGS. 2 and 3, therein is shown an embodiment in which the latching member 36 is formed in the extended portion 34. The latching member 36 has a ramped or raised portion 38.

The member 36 is integral with or connected to the extended portion 34 at one side of the member 36 (shown generally at 40). The area of connection or integration 40 is at the low point of the ramped portion 38. At the connection 40, the latching member 36 is substantially flush with an outer surface 42 of the extended portion 34. The latching member 36 extends outwardly from the surface 42 along the rise of the ramped portion 38.

As noted, the latching member 36 is integral with or connected to the extended portion 34 along only one side of the member 36. Thus, the connection area 40 provides a hinge-type configuration between the extended portion 34 and the latching member 36.

Consequently, the latching member 36 is movable between a first position such that the ramped portion 38 is below or flush with the surface 42, and a second position such that the ramped portion 38 is extended outwardly from the surface 42. When in the second position, a lip 44 extends beyond, and generally transverse to, the surface 42.

In a preferred embodiment, the latching member 36 is biased to the second or outwardly extended position relative to the surface 42. In the embodiment shown in FIG. 3, biasing is provided by the connection area 40.

The latching member 36 may also be connected to the extended portion 34 by, for example, a spring clip (not shown), coil spring (not shown), or other resilient member which provides for biasing latching member 36, accordingly.

Referring now to FIG. 4, there is shown a lateral rail 14. The lateral rail 14 includes a central portion 46 and substantially identical end portions 48. The rail has top and bottom surfaces 28, 50, which, because of the symmetry of the rail 14, are interchangeable.

Each end portion 48 has a bore or sleeve 52 formed therein, which extends through the top and bottom surfaces 28 and 50. An opening 54 extends through an end wall 56 of the rail 14, transverse to, and contiguous with the bore 52. A second opening 58 extends through an inner wall 60 into the central portion 46, and is also transverse to, and contiguous with the bore 52.

The rail 14 has a generally I-beam shaped cross-section, and may include rib-like members 62 to provide additional structural rigidity to the rail 14.

The rail 14 includes a notched area 65 in the central portion 46 adjacent to the opening 58. The rail 14 may also include receptacles 64 for receiving hooks or pegs 66 for, for example, hanging garments and the like.

With reference now to FIG. 5, there is shown a representative top or bottom rail 18 or 20. It will be recognized that the top rail 18 and bottom rail 20 are interchangeable, one with the other. For ease of discussion, and due to the orientation of the rail shown in FIGS. 2 and 5, the illustrated rail will be referred to as a bottom rail 20 with the understanding that any such discussion or description applies to a top rail 18, equally.

The rail 20 has a main body portion 68 and substantially identical end portions 70. Each end portion 70 is formed similar to the ends of the vertical members 16. Each end portion 70 includes a notch 72 which defines an extended portion 74.

Each of the extended portions 74 has a width which is about one-half of the width of the end portion 70.

The extended portions each include a latching member 76 formed therein or mounted thereto, similar to the latching member 36 of the vertical member 16. The latching member 76 has a ramped or raised portion 78 which is formed in or connected to the extended portion 74 at one side of the member 76 (shown generally at 80).

The latching member 76 is movable between a first position and a second position similar to latching member 36. When in the second position, a lip 82 extends beyond, and generally transverse to, an adjacent surface 84 of the rail 20.

In a preferred embodiment, the latching member 76 is biased to the second or outwardly extended position relative to the extended portion 74.

The rail 20 has, a generally I-beam shaped cross-section, and may include rib-like members 86 to provide additional structural rigidity to the rail 20. In a preferred embodiment, the rail 20 includes receptacles 88 for receiving caster wheels 90, or the like, for providing cart mobility.

The cart 10 is readily assembled, without tools. Whether joining a top or bottom rail 18, 20 to a vertical member 16, or joining two vertical members 16, 16, the extended portions 34, 74 are inserted into the bore 52 of a lateral rail 14. The extended portions 34, 74 are inserted, as shown in FIG. 2, from opposing directions relative to the rail 14.

As the extended portions 34, 74 are inserted into the bore 52, the latching members 36, 76 are depressed or moved inward of the extended portion 34, 74 to the first position. When the extended portions 34, 74 are fully inserted into the rail 14, the notches 32, 72 abut the opposing extended portions 34, 74.

This configuration permits the latching members 36, 76 to extend into the respective openings 54, 58, and lock the members 14, 16, 20 together. The notched area 65, best seen in FIG. 4, in the central portion 46 of the rail 14 permits full outward extension of the latching member 36, 76 therein.

The members and rails 14, 16, 20 are thus conjoined. To disassemble the cart 10, the respective latching members 36, 76 are depressed and the members 16, 16 or member 16 and rail. 20, are removed from the associated lateral rail 14.

The cart 10 of the present invention is thus readily assembled using snap-locking members for a variety of uses. The cart 10 is also readily disassembled for ease of storage or transport.

From the foregoing it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appended claims all such modifications as fall within the scope of the claims.

What is claimed is:

1. A cart comprising:
   a frame having first and second substantially identical, rectangular end frame portions, said end frame portions defining first and second planes being positioned generally parallel one to the other, each said end frame portion having at least one pair of spaced apart vertical members and top and bottom rails extending between and connecting said vertical members, each of said vertical members having first and second ends having a notch formed therein defining an extended portion, and a biased latching member located on said extended portion movable between a first position and a second position and wherein said latching member extends outwardly relative to a surface of said extended portion;
   at least one pair of substantially identical lateral rails extending generally transverse to said first and second planes and extending between and connecting said end frame portions, said rails have substantially identical ends, and being spaced apart and extending substantially parallel to one another, each of said ends defining a bore therethrough for receiving two of said vertical member extended portions inserted therein in generally opposing and abutting relation one with the other.

2. The cart of claim 1, wherein each of said rails further includes a pair of openings formed therein, in opposing relation one with the other, and wherein said openings are generally transverse to and contiguous with said bore for receiving said latching members when said latching members are in said second position.

3. The cart of claim 1 wherein each of said top and bottom rails include first and second ends having a notch formed therein defining an extended portion and being configured for receipt in one of said bores of said lateral rails in generally opposing and abutting relation with said extended portion of an adjacent vertical member.

4. The cart of claim 3 further including a latching member on each of said top and bottom rail extended portions, wherein each said latching member is movable between a first position and a second position wherein said latching member extends outwardly relative to a surface of said extended portion, and being configured for receipt in said opening of an associated lateral rail when said latching member is in said second position.

5. The cart of claim 1 wherein said latching members are integrally formed with said extended portions.

6. The cart of claim 1 wherein said latching members include means for biasing said latching members into said second position, extending outwardly relative to said surface of said extended portion.

7. The cart of claim 6 wherein said biasing means is integrally formed with said latching member.

8. The cart of claim 1 further including at least one basket, wherein said basket is receivable along a pair of corresponding lateral rails.

9. The cart of claim 1 further including caster wheels mounted to said bottom rails.

10. The cart of claim 1 wherein said latching member extends outwardly from an outward facing side of said extended portion.

\* \* \* \* \*